May 14, 1957  S. A. MINERA  2,792,113
SIZE GRADER FOR GENERALLY SPHERICAL, OVOIDAL
AND ELLIPSOIDAL OBJECTS AND MEANS FOR MOVING
SUCH OBJECTS ALONG A PATH OF TRAVEL
Filed Dec. 8, 1952  2 Sheets-Sheet 1
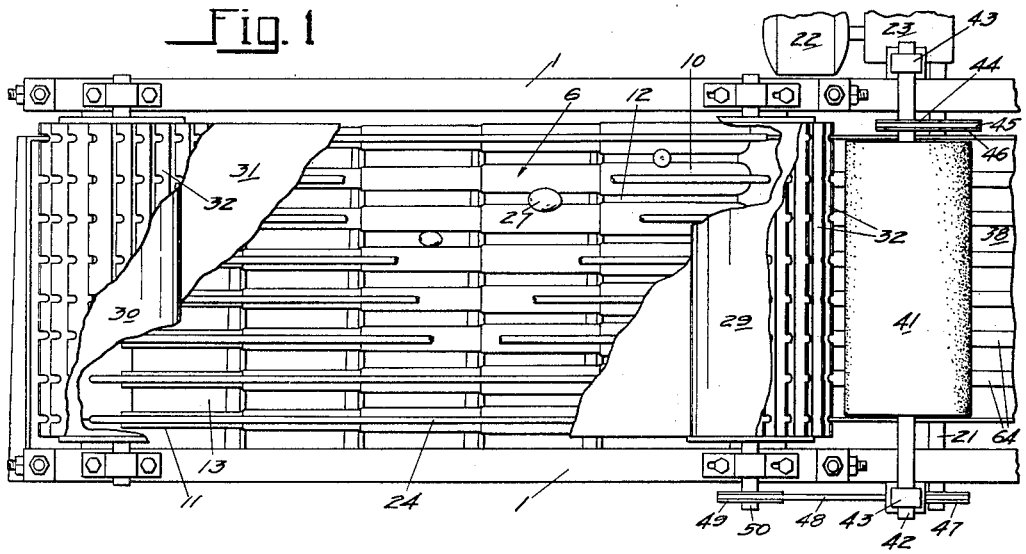
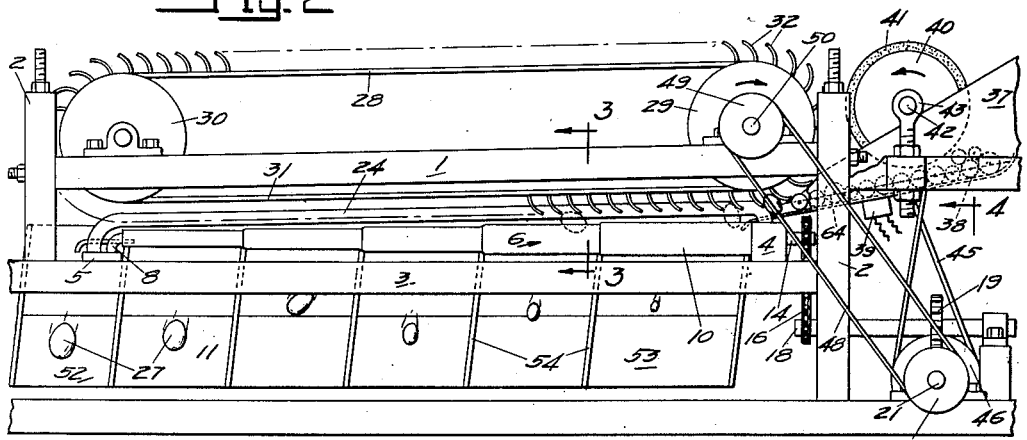
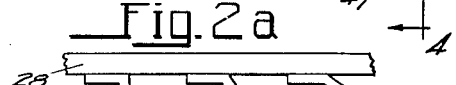
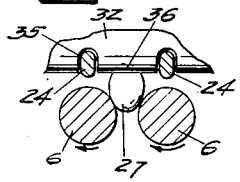
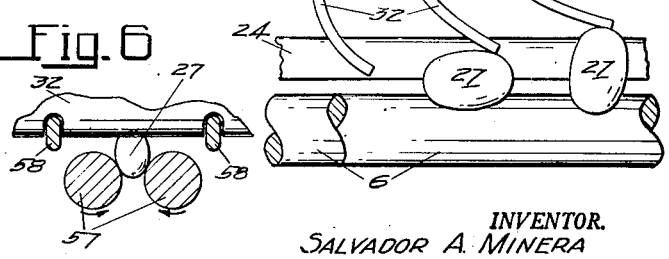
INVENTOR.
SALVADOR A. MINERA
BY
Boyken, Mohler & Beckley
ATTORNEYS May 14, 1957 S. A. MINERA 2,792,113
SIZE GRADER FOR GENERALLY SPHERICAL, OVOIDAL
AND ELLIPSOIDAL OBJECTS AND MEANS FOR MOVING
SUCH OBJECTS ALONG A PATH OF TRAVEL
Filed Dec. 8, 1952 2 Sheets-Sheet 2

INVENTOR.
SALVADOR A. MINERA
BY
Boyken, Mohler & Beckley
ATTORNEYS

United States Patent Office 2,792,113
Patented May 14, 1957

2,792,113

SIZE GRADER FOR GENERALLY SPHERICAL, OVOIDAL, AND ELLIPSOIDAL OBJECTS AND MEANS FOR MOVING SUCH OBJECTS ALONG A PATH OF TRAVEL

Salvador A. Minera, San Francisco, Calif.

Application December 8, 1952, Serial No. 324,640

12 Claims. (Cl. 209—107)

This invention relates to a device for grading generally spherical, ovoidal and ellipsoidal objects, such as balls, cherries, olives, grapes and other objects having similar shapes.

Heretofore different types of graders are used, some having holes or openings through which the objects pass and some having divergently extending conveyors movable from the convergent to divergent ends of each pair for carrying the objects to be graded therealong.

For the most part such graders are not sufficiently reliable and they take up too much room and are too expensive and complicated and are not capable of grading a sufficient number of objects per hour.

The highly complicated graders are equally high in their upkeep expense and their capacity per hour is too low for both upkeep and original high cost.

One of the objects of this invention is the provision of a grader that is economical to operate, accurate, small in size and that is capable of grading a large number of objects per hour or unit of hour.

Another object of the invention is the provision of a grader that is easily cleaned and the operation of which is not affected by water and that is equally capable of grading spherical, ovoidal and ellipsoidal objects.

A still further object of the invention is the provision of a grader in which the objects to be graded are forced along a path or paths of travel at a high rate of speed without injury thereto where such objects are fruit or the like, and which grader also orients ovoidal or ellipsoidal objects so as to grade them according to their minor axes or their minimum diameters so as to insure accurate grading for size in such instances as where the objects are not spherical.

An added object is an improved method of grading by positively rolling the objects to be graded about their minor axes where they are elongated and without injury to said objects, and a still further object is the provision of means in a grader or apparatus having somewhat similar parts, for urging different sized objects such as cherries, olives, grapes, etc. against parallel rollers and rolling them end over end (where ellipsoidal or ovoidal in shape) without injury to the objects and which means is not affected by water, being waterproof and nonmoisture absorbent.

Other objects and advantages will appear in the description and in the drawings.

In the drawings Fig. 1 is a top plan view of the grader with parts broken away to reveal portions that would otherwise be hidden.

Fig. 2 is a side elevational view of the grader shown in Fig. 1.

Fig. 2a is an enlarged, fragmentary view of a portion of the device illustrating how the objects to be graded are moved along.

Fig. 3 is an enlarged fragmentary sectional view of a portion of the machine of Fig. 2, taken at the plane 3—3 of Fig. 2.

Fig. 6 is an enlarged fragmentary sectional view similar to that of Fig. 3, but with respect to a grader of the type shown in Fig. 5.

Figure 4:
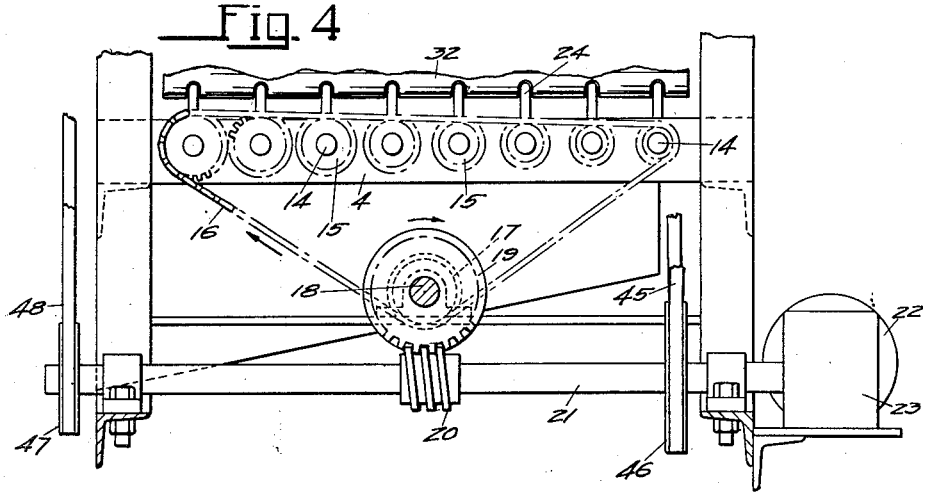
Fig. 4 is an end view of the machine of Fig. 2 (partly in section) as seen from line 4—4 of Fig. 2.

In detail, the grader of Figs. 1 to 3 inclusive comprises a frame having horizontally extending side members 1 (Figs. 1, 2) and vertical supporting posts 2 (Fig. 2). Side frame members 3 may extend below frame members 1 and between posts 2 while cross members 4, 5 may extend between the respective corresponding ends of said members 3 (Fig. 2). The cross member 4 may support one of the corresponding ends of a horizontally extending row of horizontally extending members 6 in horizontally spaced side by side relation, while the cross member 5 may carry bearings 8 (Fig. 2) for rotatably supporting the other ends of members 6.

The said members 6 in Figs. 1 to 3, are in the form of rollers that have their longitudinal axes parallel. These rollers as shown in Fig. 1 are in sections, each having substantially the same length and each section being of uniform diameter, but this diameter successively decreases in successive sections, starting from the largest diameter sections 10 at the right hand end as seen in Figs. 1, 2 and ending with the smallest diameter sections 11 at the left hand end. The result of this is that the spacing between the corresponding sections of the rollers successively increases from right to left, as seen in Figs. 1, 2 and these spaces virtually constitute slots of successively increasing width from right to left with the slots 12 at the right hand ends of the rollers being the narrowest and slot 13 at the left hand end being the widest. In Figs. 1, 2 five sections are shown, which means that the particular grader shown will grade six sizes, since the objects too large to pass through the fifth slots or spaces 13 will go over the ends of the rollers.

Shafts 14 rotatably extend through the cross member 4, which member is perhaps more accurately called a bearing block, since it rotatably supports shafts 14 that are rigid with the rollers 6. These shafts each have a sprocket wheel 15 secured thereto and, as seen in Fig. 4, the sprocket wheels 15 are of progressively decreasing diameter from one end of the row of shafts to the other, and a sprocket chain 16 extends straight across the sprocket wheels and in engagement therewith and over a sprocket wheel 17 that, in turn is secured on a shaft 18 (Figs. 2, 4).

The shaft 18 carries a gear 19 the teeth of which mesh with a worm 20 (Fig. 4) on a shaft 21 that is parallel with the bearing block 4 at the right hand end of the grader, which end is the feed end. Said shaft 21 may be driven by a motor 22 through a gear box 23 (Fig. 4).

Upon actuation of the motor 22 it will be seen that all of the rollers 6 will be rotated in the same direction, but one roller of each adjacent pair will be rotated slower than the other. This is important, particularly with ovoidal or ellipsoidal objects, as will be explained later on.

Centered over each of the rollers 6, and extending longitudinally thereof, is an elongated element 24 (Fig. 3). These elements are arranged to have substantially the same distance from the respective sections of the rollers, so will be slanted from the larger diameter ends of the rollers to the smaller diameter ends, and they terminate outwardly of the opposite ends of the roller therebelow, being curved downwardly at their ends to seat in or against the blocks that support the rollers. The left hand ends of the rollers (as seen in Fig. 2) may be journalled to receive therein supports 8 that in turn are carried on a cross frame member of block 5.

These elements 24 as seen in Fig. 3 may be bars having rounded upper sides and they cooperate with the rollers therebelow to form the sides of channels, the bottoms of which have the slots 12, 13 and those between 12 and 13 so that objects 27 to be graded, will be positioned between the adjacent bars for movement longitudinally thereof.

The rollers, as already mentioned, are preferably horizontal, and extending from end to end of the rollers and over them means for not only causing the objects 27 to be rolled from end sections 10 of the rollers to and past the opposite end sections 11, but which means yieldably urges said objects downwardly.

The aforesaid means comprises an endless horizontally extending strip carrier 28 that is supported at opposite ends on pulleys 29, 30 for movement of the lower run 31 thereof in direction from the end sections 10 to and past end sections 11 of the rollers.

This carrier has secured to its outwardly facing side uniformly spaced strips 32 of water proof and non-moisture absorbent material, such as rubber or plastic composition material. These strips extend at right angles to the axes of the rollers with one of their longitudinal edges secured to the carrier and depending from said lower run 31. The strips are quite flexible and preferably have about the same characteristic as the rubber of automobile inner tubes in weight, thickness and flexibility. This refers to standard tubes for ordinary passenger automobiles.

These strips 32 are preferably of uniform width, and the endless strip carrier is so positioned over the rollers and over elements 24 that the lower run of the carrier is spaced above the elements 24 and rollers 6 a sufficient distance to enable the largest object to be graded to be supported by the rollers without receiving pressure from the carrier itself.

The widths of the strips 32 should be such that they will be slidably supported on elements 24 in inclined position (Fig. 2a) with their lower free edges trailing.

The upper edges of the elements 24 may be positioned sufficiently close to the rollers so that the lower edges of the strip 32 can be straight, but in many instances it has been found convenient to notch or to recess said lower edges, as at 35 (Fig. 3) so that portions 36 of the strips will extend between the adjacent elements.

The spacing between the lower edges of the adjacent strips 32 of each pair thereof is preferably a distance slightly less than the maximum diameter of the objects that are to be graded.

As mentioned, the right hand end of the grader, as seen in Figs. 1, 2 is the feed end, and a feed hopper 37 is positioned at said end, which hopper has an inclined bottom 38 the lower edge of which extends over the right hand ends of sections 10 of the rollers. Any suitable conventional vibrator 39 may be connected with the hopper for causing vibration thereof, and over bottom 38 adjacent to the pulley 29 is a relatively large diameter roller 40 having an outer layer of soft material 41 the outer surface of which is spaced from bottom 38 a sufficient distance to permit a layer of objects 27 to freely pass therebelow.

Roller 40 is on a shaft 42 that is journalled in bearings 43, and said shaft carries a pulley 44 (Fig. 1) that is connected by a belt 45 (Fig. 2) with a pulley 46 on shaft 21 (Fig. 4).

A pulley 47, also on shaft 21 is connected by a belt 48 (Fig. 2) with pulley 49 on the shaft 50 that carries pulley 29 of the endless strip carrier 28.

The belt 45 is crossed so as to drive the roller 40 in a direction opposite to the pulley 29, thus objects on the bottom 38 of the feed hopper that tend to pile up will move away from the space between the roller and the hopper bottom instead of tending to be crowded into said space. This arrangement in combination with the vibrator keeps an even flow of objects to be graded to the rollers.

In operation, assuming ovoidal or ellipsoidal objects are being graded, the motor is started and the feed of such objects is commenced. The lower run of the strip carrier will move in direction from the sections 10 of the rollers toward and past sections 11.

Due to the difference in speed between the adjacent rollers of each pair and the fact that at least one of the strips 32 yieldably urges each object 27 against the rollers and starts to roll them toward sections 11, the objects 27 will immediately position themselves with their axes in vertical planes that bisect the spaces between rollers, and the said objects will be rolled end over end toward the left hand end of the machine.

As soon as the objects reach points along the lengths of the rollers when they can pass downwardly between the rollers, they will so pass and, a separate chute is positioned below each of the spaces between corresponding diameter sections of the rollers to receive such objects. The smallest objects will go into chute 53 (Fig. 2) at the right hand end of the grader, and successively larger objects will pass into their respective chutes with the objects that are carried over the ends of the rollers going into end chute 52, at the left hand end of the grader.

It is to be noted that the partitions 54 between the chutes of each adjacent pair are common to each such pair, and are slanted downwardly from their upper edges in the same direction as the objects 27 are moved over the grader. This arrangement prevents the objects that fall into the chutes from being injured by impact against said partitions, for in the operation of the grader, the objects passing through the slots or spaces between rollers have quite a bit of forward momentum, and if the objects are grapes, for example, their impact against the chute walls could cause some injury to the fruit.

Inasmuch as it is common in some instances to use a considerable amount of water in graders to keep fruit pieces or other material from gumming them, the use of strips 32 of solid rubber or the like prevents any of the water being absorbed by said strips. Furthermore, the pressure exerted by the depending strips is sufficient to roll the objects along the rollers without injuring them, as said strips virtually constitute light resilient leaves that swing up and down as ellipsoidal or ovoidal objects are rolled end over end, and there may be a very great difference between the major and minor axes of such objects without materially varying the pressure of the strips on them as said objects are rolled end over end.

Inasmuch as the side of one roller that defines one side of each slot formed by the adjacent rollers of each pair moves upwardly, while the other moves downwardly, there is no tendency for the rollers to squeeze the objects through said spaces or slots.

Figure 5:
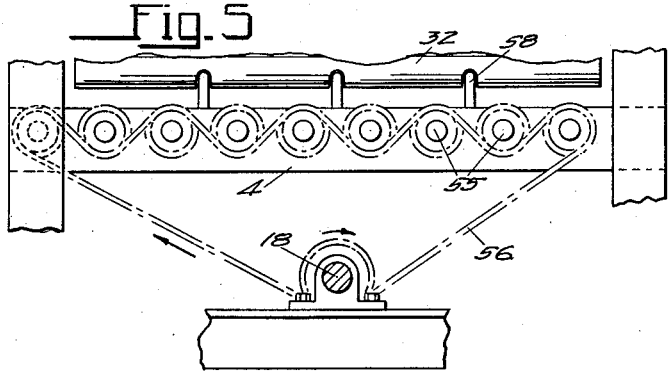
Fig. 5 is a fragmentary end view of a slightly modified form of driving arrangement for the grader, said view being taken from substantially the same position as Fig. 4.

In Figs. 5 and 6 the same rollers are used as before described, but they are driven differently. In this form of the invention, sprocket wheels 55 at the upper ends of the rollers are of the same diameter, and sprocket chain 56 is threaded between the adjacent sprockets so that rollers 57 of successive pairs (Fig. 6) rotate oppositely so that their adjacent sides move upwardly as indicated by the arrows in Fig. 6.

In this form of invention, elements 58 that extend longitudinally of the rollers must be positioned between each set or pair of rollers as seen in Fig. 6. The capacity of the machine is half that of the arrangement shown in Figs. 3, 4, but there are instances where the objects to be graded are better adapted to an arrangement in which the rollers that define the grading slots move in the direction shown in Fig. 6. By this arrangement any tendency of objects to drift across the rollers is eliminated, although in Fig. 3 the elements 24 and the strips 32 control such tendency.

Of course, where the arrangement shown in Fig. 6 is used, the notches 60 for bars or elements 58 are more widely spaced apart.

Figure 7:
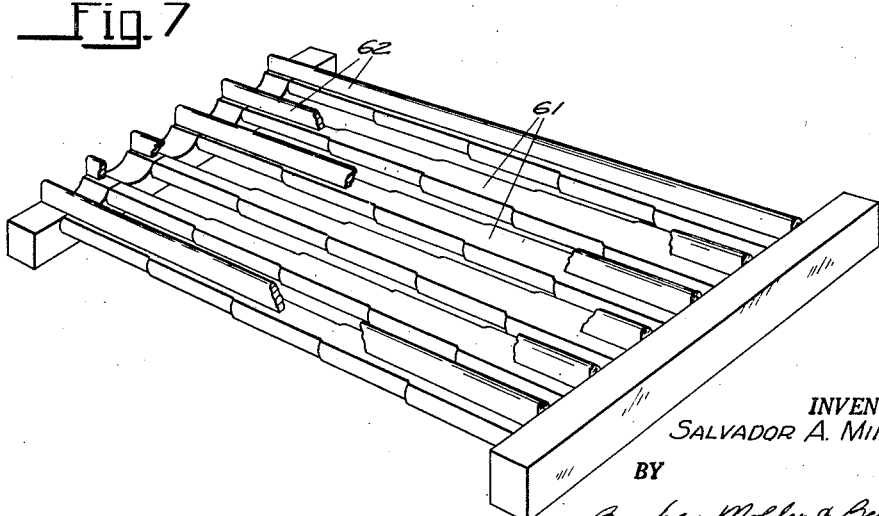
Fig. 7 is a perspective view of a grader bed in which fixed plates or the like are used instead of rollers such as are shown in Fig. 1 and certain parts of the device of Fig. 7 are broken away to show the structure better.

In Fig. 7 an arrangement is shown in which grading slots substantially as provided in Figs. 1, 2 are provided, but instead of being defined by rollers, they may be stamped from a plate, or flat bars 61 with rounded edges provided, the main consideration being that such objects as fruit will not be injured in passing through the slots or in rolling along the bars or strips that define the grading slots.

In the arrangement shown in Fig. 7, elements 62 that correspond to elements 24 are provided, and function in the same manner and for the same purpose as said elements 24. The same endless carrier and strips 32 are used. Of course, the grader using the structure of Fig. 7 is more suitable for grading generally spherical objects, such for example, as cherries, peaches, plums, balls, etc. in which the objects need not be oriented with respect to their major-minor axes in order to effect a good grading.

The capacity of the grader structures above described and illustrated in Figs. 1 to 7 is far in excess of graders using gravity for rolling along supports, or where the supporting surface carries the objects, since with the present device within a total length of the rollers of from only about 15 to 24 inches, a full grading of from three to six sizes can be graded where the objects are of about the size of grapes, olives, cherries and the like and the speed at which the objects are moved along the rollers or bars, is dependent upon the speed at which the strips 32 are moved, which may be relatively high.

The construction of the strip carrier may be one in which the carrier 28 is a belt or it may be of any structure that will properly support the strips 32, and as the total length of the belts between pulleys is normally relatively small, the carrier usually requires no support, although one can be provided along its edges if found necessary, such supports for belts being common where runs of a belt may tend to sag to an undesired degree.

It is preferable in making the feed hopper 37 to provide raised guide means extending longitudinally of each of the elements 24, and in alignment therewith, above the bottom of the hopper to guide the objects on the hopper or feed chute to the spaces between said elements. These raised guide means may be bars or merely portions 64 of the bottom of the hopper itself (Figs. 1, 2).

It may also be pointed out that the claims are intended to cover any obvious modifications of the invention that come within the scope thereof. For example, while the form shown in Fig. 6 is the preferred form, it is obvious that if one of the rollers of each pair were to remain stationary, the grader would function, and it is not essential under all circumstances that the strips 32 be notched.

Also, in actual practice, the strips 32 may lay flat against the upper run of the belt instead of projecting upwardly, as seen in Fig. 2, and swing by gravity to the position supported on elements 24 or strips 32 could obviously be slit perpendicularly thereof from their free edges for a substantial distance directly above each of the rollers and also the elements 24 could be eliminated if the distance between the ends of the lower run is sufficiently short to prevent objectionable sagging of said run, thus each adjacent pair of rollers would have a flexible hold-down flap, as it were. The main purpose of elements 24 is to prevent undue weight on the fruit or objects being moved along, and there must be sufficient space between the belt or carrier and the flaps to enable the strips to swing freely upwardly under the influence of the objects 27 without having the weight of the belt or carrier to consider. Fig. 2a clearly illustrates this.

I claim:

1. In a conveyor system, a horizontally extending support for supporting generally spherical, ovoidal and ellipsoidal objects thereon for rolling in one direction in a horizontally extending path, a horizontally extending row of flexible strips above said support extending horizontally across said path and depending from one of their longitudinally extending edges, strip moving means movable in said one direction to which said one of the longitudinally extending edges of said strips are secured with said latter edges of adjacent strips in said row spaced apart, said strips being positioned over said support sufficiently close to the latter to yieldably engage such objects on said support during said movement of said strips and means for so supporting said strips.

2. In a conveyor system, a horizontally extending support for supporting generally spherical, ovoidal and ellipsoidal objects thereon for rolling in one direction in a horizontally extending path, a horizontally extending row of flexible strips above said support, said strips extending horizontally across said path and depending from one of their longitudinal extending edges, strip moving means movable in said one direction and to which means said one of the longitudinally extending edges of said strips are secured with said latter edges of adjacent strips in said row spaced apart, said strips being positioned over said support sufficiently close to the latter to yieldably engage such objects on said support during said movement of said strips, and means for so supporting said strips, said strips being of waterproof material and the spacing between the adjacent edges of each adjacent pair of said strips where they depend from said strip moving means being a distance no greater than the width of each strip of each such adjacent pair.

3. In a conveyor system, a horizontally extending support for supporting generally spherical, ovoidal and ellipsoidal objects thereon for rolling in one direction in a horizontally extending path, a horizontally extending row of flexible strips above said support, said strips extending horizontally across said path and depending from one of their longitudinally extending edges, strip moving means movable in said one direction and to which means said one of the longitudinally extending edges of said strips are secured with said latter edges of adjacent strips in said row spaced apart, said strips being positioned over said support sufficiently close to the latter to yieldably engage such objects on said support during said movement of said strips, said strips being of waterproof material and the spacing between the adjacent edges of each adjacent pair of said strips where they depend from said strip moving means being a distance no greater than the width of each strip of each such adjacent pair, means extending longitudinally of said support defining the sides of a channel between which said objects are adapted to roll with said support being the bottom of such channel.

4. Apparatus for grading generally spherical, ovoidal and ellipsoidal objects for size comprising a pair of horizontally elongated members in horizontally spaced side by side relation for supporting such objects therein centered relative to the space between such members for rolling from one of the corresponding ends of said members toward their opposite ends, the spacing between the end portions of said members at said one of their ends being substantially less than the spacing between the end portions of said members at their said opposite ends, an endless strip carrier above said members having a lower run extending longitudinally of said members and means for moving said run in direction from said one of said corresponding ends to the other of said corresponding ends, flexible, spaced strips extending transversely and horizontally across the space between said members, one of the longitudinal edges of each of said strips being secured to said carrier and said strips freely depending from said lower run and from the edges so secured to said carrier for yieldably engaging objects supported by said members to cause said rolling thereof when said lower run is moved in said direction.

5. Apparatus for grading generally spherical, ovoidal and ellipsoidal objects for size comprising a pair of horizontally elongated members in horizontally spaced side by said relation for supporting such objects therein centered relative to the space between such members for rolling from one of the corresponding ends of the latter toward their opposite ends, the spacing between the end portions of said members at said one of their ends being substantially less than the spacing between the end portions of said members at their said opposite ends, an endless strip carrier above said members having a lower run extending longitudinally of said members and means for moving said run in direction from said one of said corresponding ends to the other of said corresponding ends, flexible, spaced strips extending transversely and horizontally across the space between said members, one of the longitudinal edges of each of said strips being secured to said carrier and said strips freely depending from said lower run and from the edges so secured to said carrier for yieldably engaging objects supported by said members to cause said rolling thereof when said lower run is moved in said direction, one of said members being an elongated roller, and means for rotating said roller so that its surface that is adjacent to the other member will move upwardly.

6. Apparatus for grading generally spherical, ovoidal and ellipsoidal objects for size comprising a pair of horizontally elongated members in horizontally spaced side by side relation for supporting such objects therein centered relative to the space between such members for rolling from one of the corresponding ends of the latter toward their opposite ends, the spacing between the end portions of said members at said one of their ends being substantially less than the spacing between the end portions of said members at their said opposite ends, an endless strip carrier above said members having a lower run extending longitudinally of said members and means for moving said run in direction from said one of said corresponding ends to the other of said corresponding ends, flexible, spaced strips extending transversely and horizontally across the space between said members, one of the longitudinal edges of each of said strips being secured to said carrier and said strips freely depending from said lower run and from the edges so secured to said carrier for yieldably engaging objects supported by said members to cause said rolling thereof when said lower run is moved in said direction, both of said members being elongated rollers, and means for rotating said rollers so that the surface of one of them that is adjacent to the other will move upwardly.

7. Apparatus for grading generally spherical, ovoidal and ellipsoidal objects for size comprising a pair of horizontally elongated members in horizontally spaced side by side relation for supporting such objects therein centered relative to the space between such members for rolling from one of the corresponding ends of the latter toward their opposite ends, the spacing between the end portions of said members at said one of their ends being substantially less than the spacing between the end portions of said members at their said opposite ends, an endless strip carrier above said members having a lower run extending longitudinally of said members and means for moving said run in direction from said one of said corresponding ends to the other of said corresponding ends, flexible, spaced strips extending transversely and horizontally across the space between said members, one of the longitudinal edges of each of said strips being secured to said carrier and said strips freely depending from said lower run and from the edges so secured to said carrier for yieldably engaging objects supported by said members to cause said rolling thereof when said lower run is moved in said direction, elongated elements respectively adjacent to each of said members extending longitudinally of the latter and means supporting said elements with their upper sides elevated above the uppermost sides of said members for supporting said strips clear of said members.

8. Apparatus for grading generally spherical, ovoidal and ellipsoidal objects for size comprising a pair of horizontally elongated members in horizontally spaced side by side relation for supporting such objects therein centered relative to the space between such members for rolling from one of the corresponding ends of the latter toward their opposite ends, the spacing between the end portions of said members at said one of their ends being substantially less than the spacing between the end portions of said members at their said opposite ends, an endless strip carrier above said members having a lower run extending longitudinally of said members and means for moving said run in direction from said one of said corresponding ends to the other of said corresponding ends, flexible, spaced strips extending transversely and horizontally across the space between said members, one of the longitudinal edges of each of said strips being secured to said carrier and said strips freely depending from said lower run and from the edges so secured to said carrier for yieldably engaging objects supported by said members to cause said rolling thereof when said lower run is moved in said direction, elongated elements respectively adjacent to each of said members extending longitudinally of the latter and means supporting said elements with their upper sides elevated above the uppermost sides of said members for supporting said strips clear of said members, said strips being recessed along their lower edges to receive the upper sides of said elements therein.

9. Apparatus for grading generally spherical, ovoidal and ellipsoidal objects for size comprising; a horizontally extending row of horizontally elongated rollers arranged in side by side relation, means supporting said rollers for rotation and means for rotating them in the same direction, a strip carrier above said rollers supported for movement from one of their corresponding ends toward the other of their corresponding ends, means for so moving said carrier, flexible strips secured to said carrier along one of their longitudinally extending edges and swingably depending from said carrier, said strips extending horizontally across said row at right angles to said rollers, horizontally elongated elements resepctively adjacent each roller slidably supporting the lower edges of said strips spaced slightly from said rollers, said rollers being horizontally spaced apart at progressively greater distances commencing at said one of their corresponding ends, said elements being uniformly horizontally spaced apart a substantially greater distance than the spacing between the rollers at said one of their corresponding ends and means for feeding said objects onto said rollers at their last mentioned ends and between the elements of the adjacent pairs thereof.

10. Apparatus for grading generally spherical, ovoidal and ellipsoidal objects for size comprising; a horizontally extending row of horizontally elongated members in side by side horizontally spaced relation with the said elements being in sections longitudinally thereof, the successive sections commencing with one of the corresponding ends of said members being of progressively decreasing width whereby the adjacent sides of the sections of adjacent pairs will define successive slots of increased width from said one of the ends of said members, a strip carrier over said members extending longitudinally thereof and means for moving said carrier in direction from the said one of their ends toward the other of their ends, relatively soft and flexible strips extending across said slots secured along one of their longitudinally extending edges to said carrier and depending from said edges with their lower longitudinally extending edges adjacent to said members for forcing objects supported on adjacent pairs of said members and across said slots through said slots and for rolling on said members longitudinally of said slots in the direction of movement of said carrier.

11. Apparatus for grading generally spherical, ovoidal and ellipsoidal objects for size comprising; a horizontally extending row of horizontally elongated members in side by side horizontally spaced relation with the said elements being in sections longitudinally thereof, the successive sections commencing with one of the corresponding ends of said members being of progressively decreasing width whereby the adjacent sides of the sections of adjacent pairs will define successive slots of increased width from said one of the ends of said members, a strip carrier over said members extending longitudinally thereof and means for moving said carrier in direction from the said one of their ends toward the other of their ends, relatively soft and flexible strips extending across said slots secured along one of their longitudinally extending edges to said carrier and depending from said edges with their lower longitudinally extending edges adjacent to said members for forcing objects supported on adjacent pairs of said members and across said slots through said slots and for rolling on said members longitudinally of said slots in the direction of movement of said carrier, a chute disposed below each slot of the same width, walls dividing said chutes, said walls extending transversely of the lengths of said members and slanted downwardly in direction of said movement of said carrier.

12. Apparatus for grading generally spherical, ovoidal and ellipsoidal objects for size comprising; a horizontally extending row of horizontally elongated members in side by side horizontally spaced relation with the said elements being in sections longitudinally thereof, the successive sections commencing with one of the corresponding ends of said members being of progressively decreasing width whereby the adjacent sides of the sections of adjacent pairs will define successive slots of increased width from said one of the ends of said members, a strip carrier over said members extending longitudinally thereof and means for moving said carrier in direction from the said one of their ends toward the other of their ends, relatively soft and flexible strips extending across said slots secured along one of their longitudinally extending edges to said carrier and depending from said edges with their lower longitudinally extending edges adjacent to said members for forcing objects supported on adjacent pairs of said members and across said slots through said slots and for rolling on said members longitudinally of said slots in the direction of movement of said carrier, a feed hopper at said one of the corresponding ends of said members having a bottom wall terminating in a free edge disposed adjacent to said last mentioned ends for feeding said objects onto said members, a roller over said bottom adjacent to said free edge spaced thereabove a slightly greater distance than the maximum diameter of said objects, said roller having a soft, resilient surface and extending transversely of said members, means for rotating said roller so that the side thereof nearest said bottom will move in a direction opposite to the direction of movement of said carrier, and means connected with said hopper for vibrating the same.

References Cited in the file of this patent
UNITED STATES PATENTS

| Number | Name | Date |
|---|---|---|
| 482,294 | Burke | Sept. 6, 1892 |
| 581,321 | Wilson | Apr. 27, 1897 |
| 916,647 | Anderson | Mar. 30, 1909 |
| 1,139,714 | Parker | May 18, 1915 |
| 1,582,820 | Hungerford | Apr. 27, 1926 |
| 1,643,190 | Canon | Sept. 20, 1927 |
| 1,832,035 | Leib | Nov. 17, 1931 |
| 1,873,323 | Evans | Aug. 23, 1932 |